(12) United States Patent  
Kawamura (10) Patent No.: US 8,095,301 B2  
(45) Date of Patent: Jan. 10, 2012

(54) ON-VEHICLE SYSTEM

(75) Inventor: Toshiya Kawamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 1052 days.

(21) Appl. No.: 12/000,026

(22) Filed: Dec. 7, 2007

(65) Prior Publication Data

US 2008/0147248 A1    Jun. 19, 2008

(30) Foreign Application Priority Data

Dec. 13, 2006  (JP) .................................. 2006-336179

(51) Int. Cl.
*G01C 21/00* (2006.01)

(52) U.S. Cl. ........ 701/200; 717/169; 717/170; 717/172; 717/174; 717/168; 701/1; 701/208

(58) Field of Classification Search ........... 717/168–173
See application file for complete search history.

(56) References Cited

U.S. PATENT DOCUMENTS

| | | | |
|---|---|---|---|
| 7,043,359 B2 * | 5/2006 | Yuasa | 701/208 |
| 2004/0122564 A1 | 6/2004 | Ogasawara | |
| 2006/0190144 A1 | 8/2006 | Ogasawara | |

FOREIGN PATENT DOCUMENTS

| | | |
|---|---|---|
| JP | A-2002-342102 | 11/2002 |
| JP | A-2005-238950 | 9/2005 |
| JP | A-2006-257915 | 9/2006 |
| JP | A-2007-092621 | 4/2007 |

* cited by examiner

*Primary Examiner* — Thomas Black
*Assistant Examiner* — Luke Huynh
(74) *Attorney, Agent, or Firm* — Posz Law Group, PLC (57) ABSTRACT

An on-vehicle system includes a plurality of control devices, a common data match determining unit, and a common data transmission permitting unit. Each of the plurality of control devices stores control data that includes common data and identification information. A first control device is configured to transmit the common data to a second control device such that the common data is updated. The common data match determining unit determines whether the common data of the second control device matches with the common data of the first control device based on the identification information of the common data when a first update condition is satisfied. The common data transmission permitting unit permits the first control device to transmit the common data to the second control device when the common data match determining unit determines that the common data stored in the first and second control devices mismatch with each other.

17 Claims, 8 Drawing Sheets

ON-VEHICLE SYSTEM

CROSS REFERENCE TO RELATED APPLICATION

This application is based on and incorporates herein by reference Japanese Patent Application No. 2006-336179 filed on Dec. 13, 2006.

BACKGROUND OF THE INVENTION

1. Field of the Invention

The present invention relates to an on-vehicle system that is mounted on a vehicle and that has a plurality of control devices, each of which is capable of communicating with each other.

2. Description of Related Art

A conventional navigation system is known to be an integral system of a navigation function and an audio-visual function, such as a function for playing CD/DVD, a function for receiving TV broadcastings, a function for receiving FM/AM radio broadcastings.

In general, the above navigation system is known to have a plurality of control devices (for example, a navigation control device, an audio control device), and, typically, the audio control device, which is one of the plurality of control devices, is connected with an on-vehicle LAN such that the audio control device is configured to communicate with an external device outside the system. Also, another control device, such as the navigation control device, is configured to retrieve information from the exterior of the system through the audio control device (for example, see JP-A-2004-196183 corresponding to US 2006/0190144).

Also, the above described system is configured to use common hardware and common software regardless of a model of the vehicle. In other words, a control device in the system stores common program shared between different vehicle models and parameters (e.g., a function to be given to an operation switch, an initial screen to be displayed in the display device) individually designed for each of vehicle models. The control device in the system selects a corresponding parameter in accordance with a signal, which is inputted from the exterior, and which is indicative of the vehicle model. When the control device executes the common program, the control device uses the above selected parameter to perform the process corresponding to each of the vehicle models.

In the above described system, in order to make each control device execute a process corresponding to a specific vehicle model, data (i.e., common data) having the above parameter is generated in advance. Then, each of the plurality of control devices of the system is configured to execute the process using the common data.

In other words, a unique program and common data are prestored in a memory of each control device. Here, the unique program achieves a certain respective function of each control device, and the common data is shared between the control devices and is designed for a specific vehicle model. Each control device executes its unique program using the common data such that each control device achieves certain functions (e.g., a navigation function, an audio function) correspondingly to a specific vehicle model. Thus, as a whole, the navigation system can correspond to the specific vehicle model.

In the above configured system, the common data is assumed to be updated for a version up as necessary. As in the above proposed system, a control device (for example, audio control device) that is connected to an on-vehicle LAN to communicate with an exterior device outside the system is connected with another control device (for example, navigation control device). In the above case, firstly, the common data of the audio control device is updated, and the common data of the navigation control device is updated through the audio control device. Thus, in order that each control device is always required to store the identical common data with each other, the common data is transmitted from the audio control device to the navigation control device at a certain time (for example, a time of activating the system) such that the common data stored in the navigation control device is updated using the common data stored in the audio control device.

However, as above, if the audio control device is configured to transmit the common data to the navigation control device at the certain time, a transmission process for transmitting the common data by the audio control device and a receiving process for receiving the common data by the navigation control device are repeatedly executed. As a result, for example, if the common data stored in each of the control devices matches with each other at the beginning, and thereby the common data of the navigation control device is not required to be updated, the transmission/reception of the common data may uselessly increase a communication load between the control devices.

Also, the above disadvantages occurs not only to the navigation system, but also to a system having a plurality of control devices that share (use) the common data.

SUMMARY OF THE INVENTION

The present invention is made in view of the above disadvantages. Thus, it is an objective of the present invention to address at least one of the above disadvantages.

To achieve the objective of the present invention, there is provided an on-vehicle system, which includes a plurality of control devices, a common data match determining unit, and a common data transmission permitting unit. Each of the plurality of control devices stores control data that includes common data and identification information associated with the common data. The plurality of control devices includes a first control device and a second control device. The first control device is configured to transmit the common data stored in the first control device to the second control device such that the common data stored in the second control device is updated. The common data match determining unit determines whether or not the common data stored in the second control device matches with the common data stored in the first control device based on the identification information of the common data stored in each of the first and second control devices when a first update condition for updating the common data stored in the second control device is satisfied. The common data transmission permitting unit permits the first control device to transmit the common data stored in the first control device to the second control device when the common data match determining unit determines that the common data stored in the second control device mismatches with the common data stored in the first control device.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

One embodiment of the present invention is described below with reference to accompanying drawings.

Figure 1:
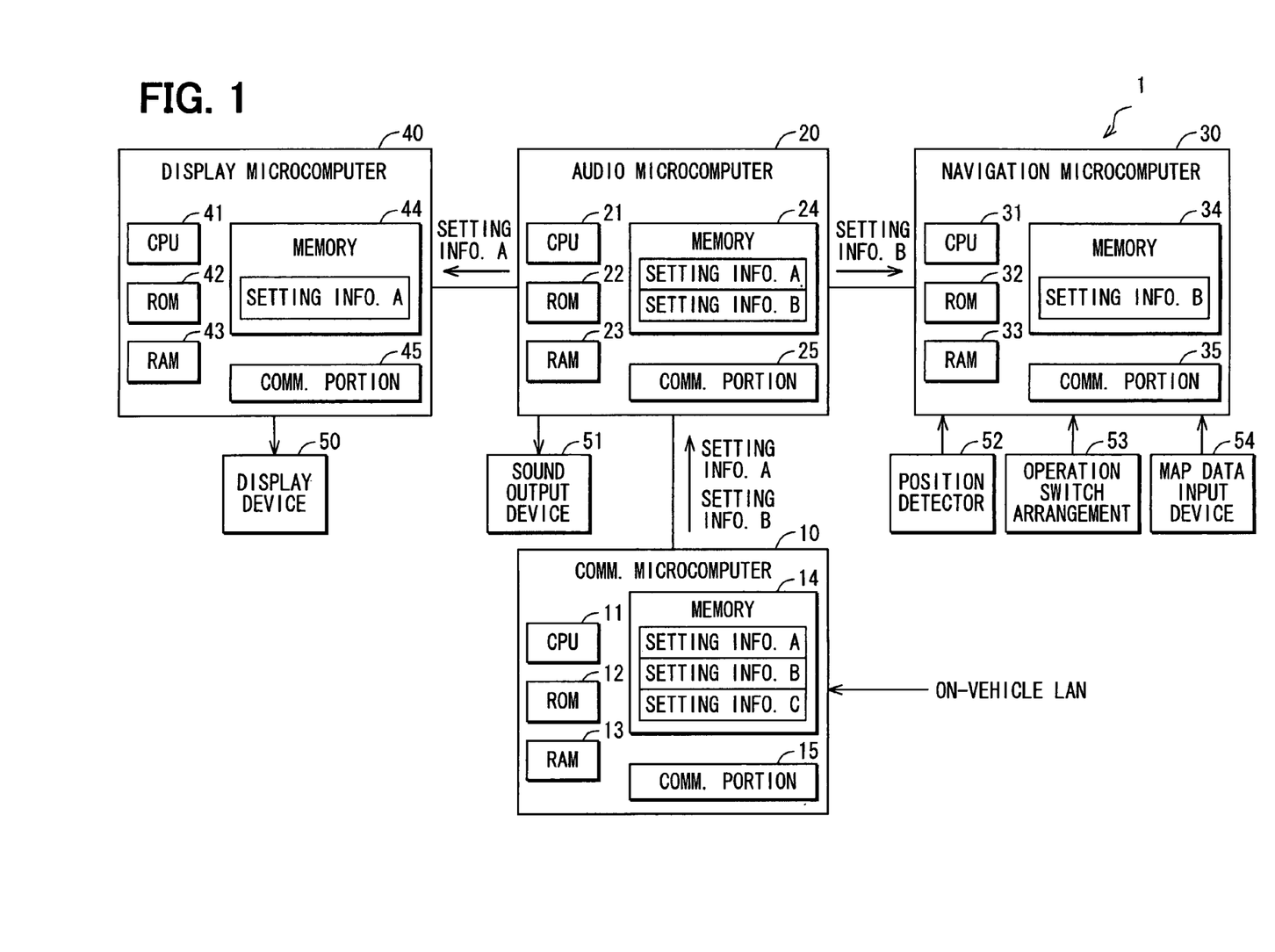
FIG. 1 is a block diagram showing a schematic configuration of a navigation system according to one embodiment of the present invention.

FIG. 1 a block diagram showing a schematic configuration of a navigation system 1 according to the one embodiment, to which an on-vehicle system of the present invention is applied.

The navigation system 1 of the one embodiment is an integrated system of a navigation function and an audio-visual function for playing CD/DVD, for receiving TV broadcastings, and for receiving FM/AM radio broadcastings. Also, the navigation system 1 includes multiple microcomputers, such as a communication microcomputer 10, an audio microcomputer 20, a navigation microcomputer 30, a display microcomputer 40. Note that, although a control device of the present invention corresponds to the microcomputer in the present embodiment, the control device of the present invention may correspond to an electronic control unit that mainly includes a microcomputer, alternatively.

The communication microcomputer 10 includes a CPU 11, a ROM 12, a RAM 13, a nonvolatile memory 14 (e.g., flash memory), and a communication portion 15. Here, data on the nonvolatile memory 14 is rewrittable. The communication portion 15 includes a communication circuit that is connected with an on-vehicle LAN for communicating with an exterior device outside the navigation system 1. Also, the communication portion 15 includes another communication circuit for communicating with the audio microcomputer 20.

The CPU 11 executes a process based on data stored in the ROM 12 and the nonvolatile memory 14, and the communication microcomputer 10 serves as a communication interface for communicating with the exterior device outside the navigation system 1 via the on-vehicle LAN.

The audio microcomputer 20 includes a CPU 21, a ROM 22, a RAM 23, a nonvolatile memory 24 (e.g., EEPROM), and a communication portion 25. Here, data in the nonvolatile memory 24 is rewritable. The communication portion 25 includes a communication circuit for communicating with each of the communication microcomputer 10, the navigation microcomputer 30, and the display microcomputer 40. Here, communication is performed with a different protocol in a different communication circuit between the corresponding devices (microcomputes). Also, the audio microcomputer 20 has an I/O port (not shown), and is connected through the I/O port with a sound output device 51 having an amplifier, a speaker.

The CPU 21 performs various processes (e.g., a process for playing CD/DVD, a process for receiving TV broadcastings, a process for receiving FM/AM radio broadcastings) based on data stored in the ROM 22 and the nonvolatile memory 24. For example, the CPU 21 outputs sound of the CD/DVD and radio through the sound output device 51, and transmits a display command for displaying an image of the DVD to the display microcomputer 40. Also, the CPU 21 outputs a guidance sound through the sound output device 51 in accordance with a sound output command received from the navigation microcomputer 30, and the CPU 21 transmits information (e.g., the display command) received from the navigation microcomputer 30 to the display microcomputer 40.

The navigation microcomputer 30 includes a CPU 31, a ROM 32, a RAM 33, a nonvolatile memory 34 (e.g., flash memory), a communication portion 35. Here, data in the nonvolatile memory 34 is rewritable. The communication portion 35 includes a communication circuit for communicating with the audio microcomputer 20. Also, the navigation microcomputer 30 includes I/O ports (not shown), and is connected with a position detector 52, an operation switch arrangement 53, and a map data input device 54 through the I/O ports. Here, the position detector 52 detects a present position of the vehicle, and a user (e.g., an occupant of the vehicle) inputs various commands through the operation switch arrangement 53. Also, the map data input device 54 reads (i.e., retrieves) map data from a storage medium.

The CPU 31 executes various processes based on data stored in the ROM 32 and the nonvolatile memory 34. For example, the CPU 31 reads the map data including the vehicle present position from the storage medium via the map data input device 54 based on the vehicle present position detected by the position detector 52, and the CPU 31 transmits a display command for displaying a road map, which includes the vehicle present position and a traced travel path, in a display device 50 to the audio microcomputer 20 based on the read map data. Also, the CPU 31 determines a travel route to a destination based on a command inputted through the operation switch arrangement 53, and then, the CPU 31 transmits a display command for displaying a travel route guidance image in accordance with the determined travel route in the display device 50 to the audio microcomputer 20. Also, the CPU 31 transmits a sound output command for outputting a guidance voice for guiding the travel route through the sound output device 51 to the audio microcomputer 20.

The display microcomputer 40 includes a CPU 41, a ROM 42, a RAM 43, a nonvolatile memory 44 (e.g., flash memory), and a communication portion 45. Here, data in the nonvolatile memory 44 is rewritable. The communication portion 45 includes a communication circuit for communicating with the audio microcomputer 20. Also, the display microcomputer 40 includes an I/O port (not shown), and is connected through the I/O port with the display device 50 having a liquid crystal display.

The CPU 41 executes processes based on the data stored in the ROM 42 and the nonvolatile memory 44, and displays images in the display device 50 in response to the display commands transmitted from the audio microcomputer 20 and the navigation microcomputer 30.

Next, there will be explained the data stored in the ROM 12, 22, 32, 42 and the nonvolatile memory 14, 24, 34, 44 of each of the above microcomputers.

The navigation system 1 of the present embodiment is configured to be able to correspond to a type, such as a vehicle model of the vehicle, on which the navigation system 1 is mounted, an area for use of the vehicle. More specifically, the ROM 12, 22, 32, 42 of each microcomputer 10, 20, 30, 40 pre-stores a basic program for achieving a corresponding function (for example, audio management, navigation) of each microcomputer 10, 20, 30, 40, and in contrast, the nonvolatile memory 14, 24, 34, 44 pre-stores information, which corresponds to the types (e.g., vehicle model, area), as a parameter used for executing the above program stored in the respective ROM 12, 22, 32, 42. Therefore, by writing a different parameter in each nonvolatile memory 14, 24, 34, 44, the navigation system 1 can correspond to a different type, although the navigation system 1 has the same component parts.

Figure 2:
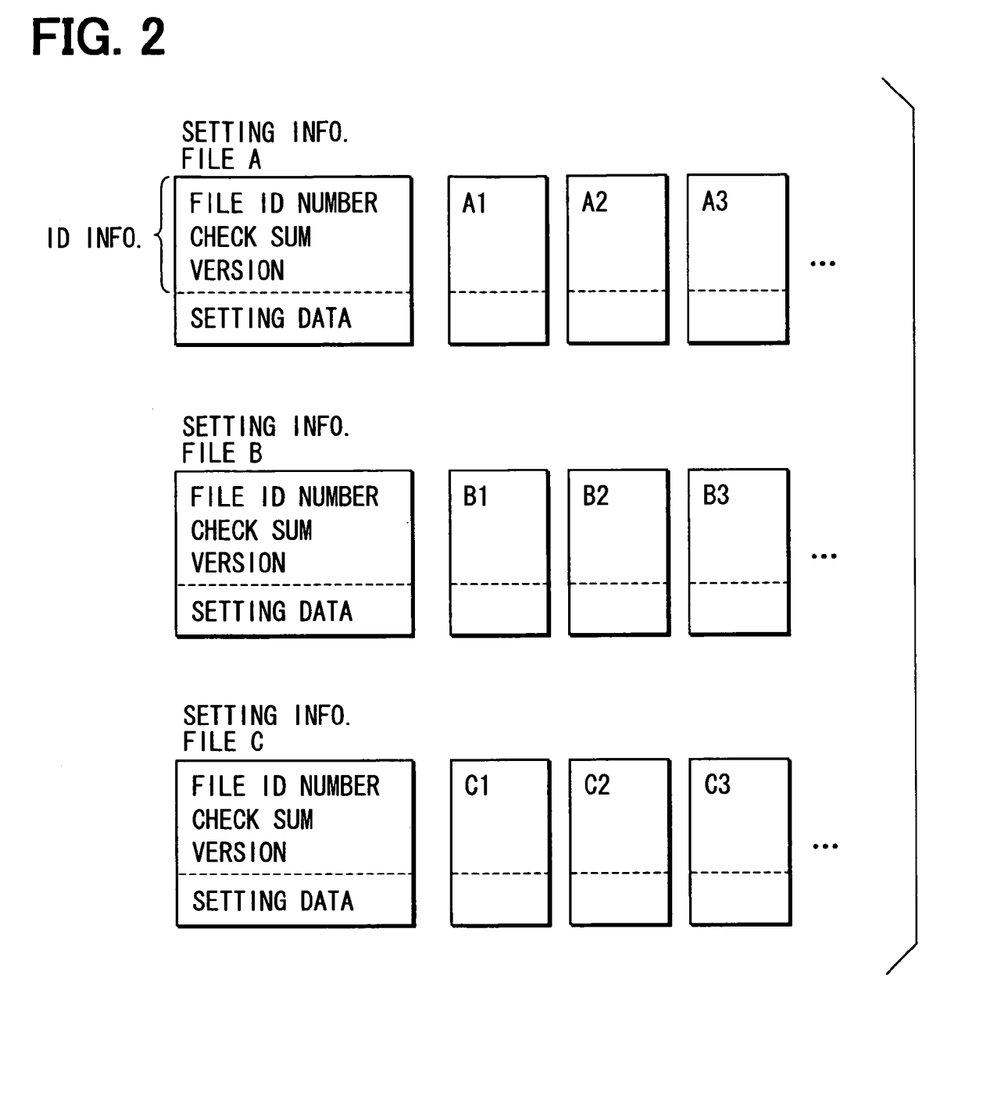
FIG. 2 is an explanatory diagram showing one example of setting information files.

Here, the above parameter is stored in the respective nonvolatile memory 14, 24, 34, 44 as setting information files as shown in FIG. 2. Note that, FIG. 2 is an explanatory diagram showing one example of the setting information files. There are the setting information files of multiple different kinds (e.g., categories A, B, C, in FIG. 2), and one setting information file is provided for each category. The categories include, for example, an audio related category (setting of a speaker, an equalizer), a radio/TV related category (setting of a tuner, such as a frequency band, a seek sensitivity), a camera related category, and an option related category.

Each setting information file includes setting data serving as the above parameter and includes identification information (ID info) for identifying the setting data. In the present embodiment, identification number (e.g., A1, A2, B1 in FIG. 2) of each setting information file, a check sum of the setting data, a version of the setting data are used as the identification information.

Note that, the multiple setting information files of different kinds are prepared to correspond to the types (e.g., the different vehicle models, options of the vehicle, areas for vehicle use, brands of the vehicle, size and shape of the vehicle) for each category (e.g., A, B, C). For each category, an appropriate setting information file for the vehicle, on which the navigation system 1 is mounted (in other words, the setting information file corresponding to the type), is selected among the multiple setting information files, and is written in the nonvolatile memory 14, 24, 34, 44 of each microcomputer 10, 20, 30, 40 that constitutes the navigation system 1.

The navigation system 1 of the present embodiment employing the setting information files of the categories A to C of three kinds (in other words, 3 categories) is described below. In the present application, the setting information files of the categories A to C are indicated as setting information files A to C. As shown in FIG. 1, the navigation microcomputer 30 prestores the setting information file of the category B (i.e., setting information file B) used for executing the process as the above navigation, and the display microcomputer 40 prestores the setting information file of the category A (i.e., setting information file A) used for executing a display process for displaying on the display device 50. Also, the audio microcomputer 20 prestores both the setting information files A, B of the above 2 kinds, and the communication microcomputer 10 prestores all setting information files (in other words, the setting information files A to C), which are used by the navigation system 1 and which include the setting information file of the category C (i.e., setting information file C) used only by the communication microcomputer 10.

Here, the setting information files A to C stored in the nonvolatile memory 14 of the communication microcomputer 10 are updated via the on-vehicle LAN as necessary for upgrade. As a result, in the navigation system 1 of the present embodiment, in order to always make the setting information files of the identical category stored in the nonvolatile memories 14, 24, 34, 44 identical with each other, communication is provided between the microcomputers 10, 20, 30, 40 in accordance with predefined communication protocols when the navigation system 1 is activated. Also, the setting information files of the other microcomputers 20, 30, 40 are updated as necessary based on the setting information files A to C of the communication microcomputer 10.

Communication protocol between each microcomputer at the time of the activation is described with reference to FIG. 3. Note that, FIG. 3 is a sequence diagram showing the communication protocol between each microcomputer at the time of the activation.

The navigation system 1 of the present embodiment is activated by turning on an ACC switch of the vehicle. In other words, as shown in FIG. 3, the turning on of the ACC switch of the vehicle transmits an activation information to the communication microcomputer 10 via the on-vehicle LAN. After the communication microcomputer 10 receives the activation information, the activation information is transmitted to the audio microcomputer 20 from the communication microcomputer 10, and further, the activation information is transmitted from the audio microcomputer 20 to the navigation microcomputer 30 and the display microcomputer 40 such that the entire of the navigation system 1 starts operation.

Figure 3:
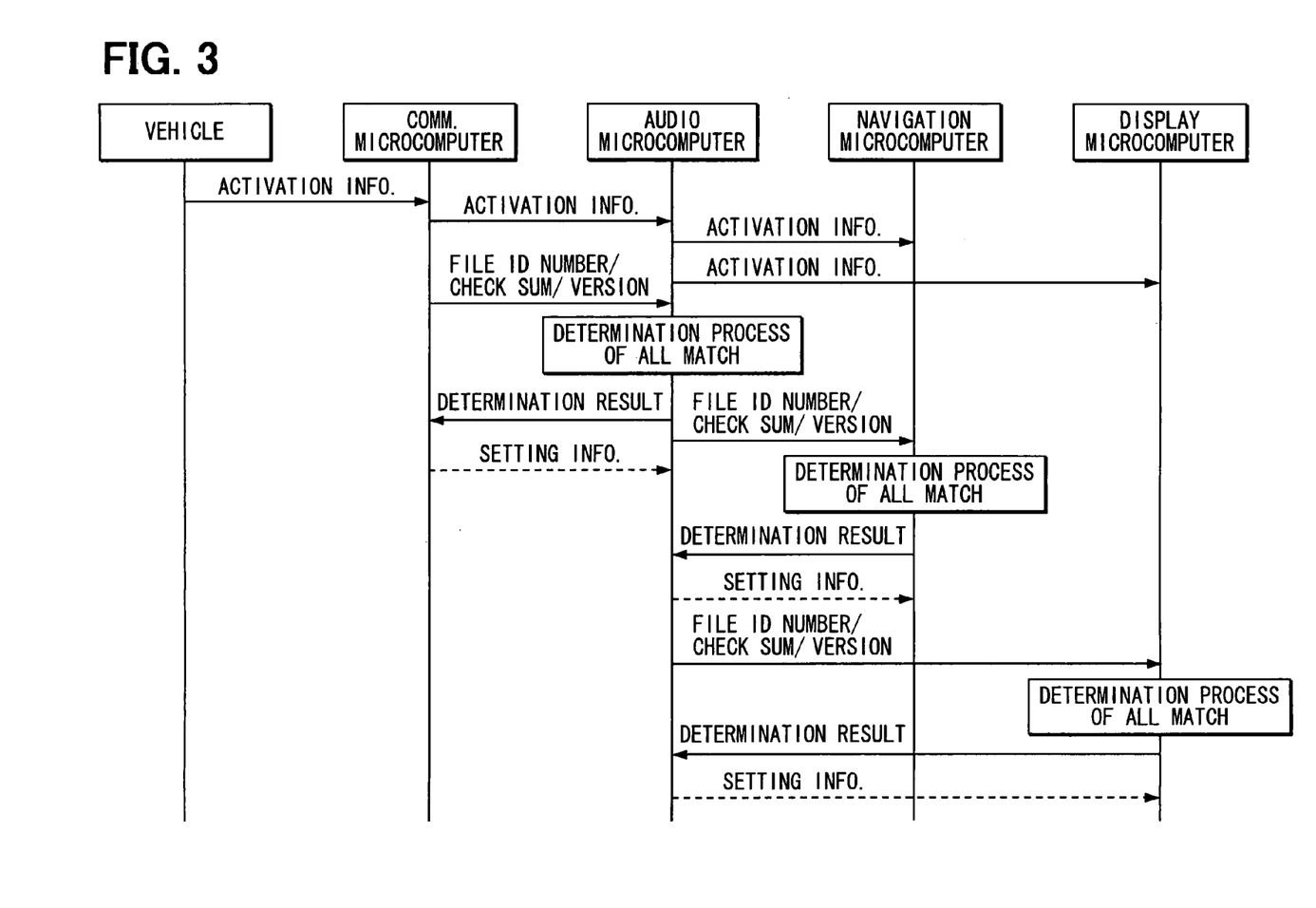
FIG. 3 is a sequence diagram showing a communication protocol between each microcomputer at a time of activation.

Then, while each microcomputer executes a corresponding activation process, communication is performed in the protocol shown in the sequence diagram in FIG. 3. The above communication includes a communication between the communication microcomputer 10 and the audio microcomputer 20, a communication between the audio microcomputer 20 and the navigation microcomputer 30, and a communication between the audio microcomputer 20 and the display microcomputer 40. Note that, for example, FIG. 3 shows the protocol, in which the audio microcomputer 20 starts communication with the display microcomputer 40 after the audio microcomputer 20 has ended communication with the navigation microcomputer 30. However, the communication in the protocol of FIG. 3 is not necessarily required to be performed because the audio microcomputer 20 has the communication circuit that can communicate with each of microcomputers independently. Also, with regard to the communication protocol between other microcomputers, the protocol shown in FIG. 3 is not necessarily required, and the protocol can be changed as necessary.

Figure 4:
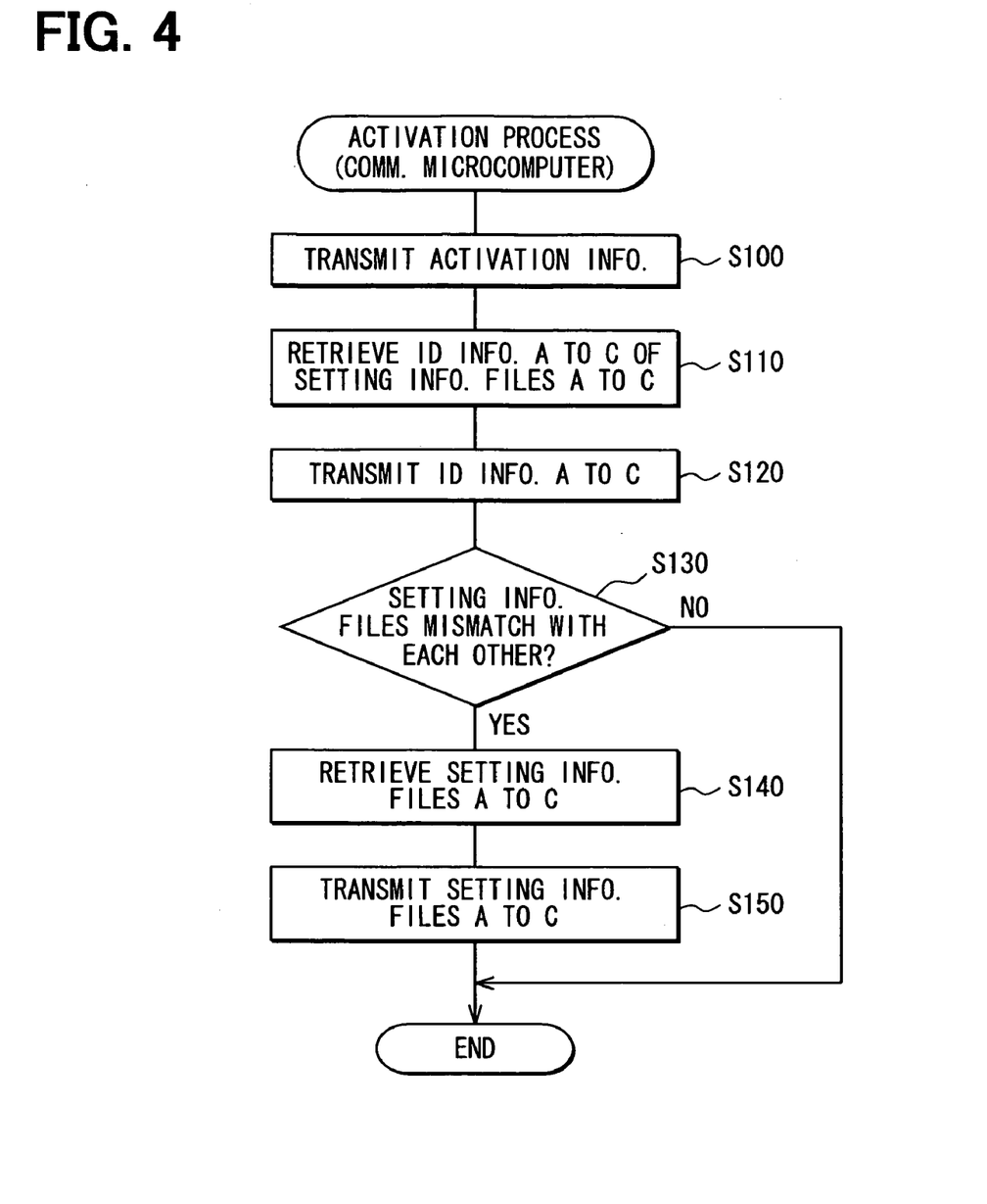
FIG. 4 is a flow chart showing an activation process of a communication microcomputer.

An activation process that is executed at the time of activating each microcomputer is described in turn. FIG. 4 is a flow chart showing the activation process executed by the communication microcomputer 10.

When the communication microcomputer 10 receives the activation information (i.e., when a first update condition of the present invention is satisfied), the process is started. When the process is started, as shown in FIG. 4, at S100, the activation information is transmitted to the audio microcomputer 20. Then, the communication microcomputer 10 retrieves identification information of the categories A to C (i.e., identification information A to C) included by each of the setting information files of the categories A to C (i.e., the setting information files A to C) stored in the nonvolatile memory 14 at S110, and the communication microcomputer 10 transmits the retrieved identification information A to C to the audio microcomputer 20 at S120. Here, each identification information includes a file identification number, a check sum, and a version.

Next, at S130, it is determined whether or not the setting information files stored in the communication microcomputer 10 mismatch with (e.g., are different from) the corresponding setting information files stored in the audio microcomputer 20 based on a determination result receive from the audio microcomputer 20. Then, when it is determined that the setting information files stored in the communication microcomputer 10 mismatch with the corresponding setting information files stored in the audio microcomputer 20 (YES at S130), control proceeds to S140, and the communication microcomputer 10 retrieves the setting information files A, B stored in the nonvolatile memory 14. At S150, the communication microcomputer 10 transmits the retrieved setting information files A, B to the audio microcomputer 20, and the present process is ended.

Figure 5:
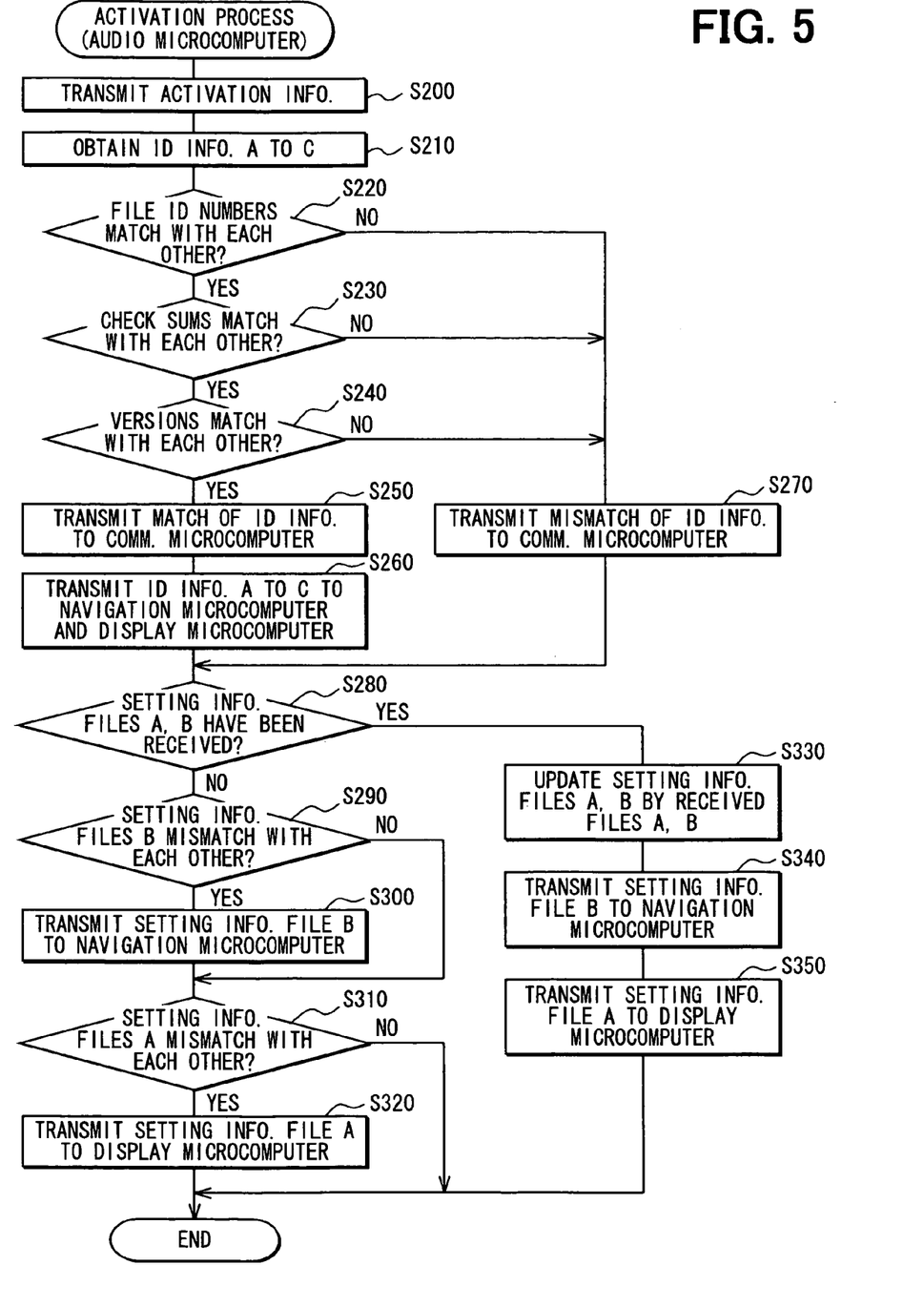
FIG. 5 is a flow chart showing an activation process of an audio microcomputer.

Next, an activation process of the audio microcomputer 20 is described. FIG. 5 is a flow chart showing the activation process executed by the audio microcomputer 20.

When the audio microcomputer 20 received the activation information transmitted from the communication microcomputer 10 (i.e., when a second update condition of the present invention is satisfied), the process is started. When the process is started, firstly, as shown in FIG. 5, at S200, the audio microcomputer 20 transmits the activation information to each of the navigation microcomputer 30 and the display microcomputer 40. At S210, the audio microcomputer 20 obtains the identification information sets A to C that are transmitted from the communication microcomputer 10, and then, the audio microcomputer 20 determines at S220 whether or not a file identification number of each of the setting information files A, B stored in the nonvolatile memory 24 matches with a corresponding file identification number included in each of the retrieved identification information sets A, B.

When the audio microcomputer 20 determines at S220 that the file identification numbers match with each other (YES at S220), control proceeds to S230, where the audio microcomputer 20 determines whether or not a check sum of each of the setting information files A, B stored in the nonvolatile memory 24 matches with a corresponding check sum of each of the retrieved identification information sets A, B.

When the audio microcomputer 20 determines at S230 that the check sums match with each other (YES at S230), control proceeds to S240, where the audio microcomputer 20 determines whether or not a version of each of the setting information files A, B stored in the nonvolatile memory 24 matches with a corresponding version included in each of the retrieved identification information sets A, B.

When the audio microcomputer 20 determines at S240 that the versions match with each other (YES at S240), control proceeds to S250, where the audio microcomputer 20 transmits a determination result indicative of the match of the identification information to the communication microcomputer 10. At S260, the audio microcomputer 20 transmits the identification information sets A to C obtained at S210 to each of the navigation microcomputer 30 and the display microcomputer 40, and control proceeds to S280.

In contrast, when the audio microcomputer 20 determines at S220 that the file identification numbers do not match with each other (NO at S220), when the audio microcomputer 20 determines at S230 that the check sums do not match with each other (NO at S230), or when the audio microcomputer 20 determines at S240 that the versions do not match with each other (NO at S240), control proceeds to S270. Then, a determination result indicative of mismatch (e.g., non-identical) of the identification information is transmitted to the communication microcomputer 10, and control proceeds to S280.

At S280, it is determined whether or not the audio microcomputer 20 has received the setting information files A, B received from the communication microcomputer 10. When it is determined that the audio microcomputer 20 has not received the setting information files A, B (NO at S280), control proceeds to S290, where the audio microcomputer 20 determines whether the setting information files stored in the audio microcomputer 20 matches with the corresponding setting information file stored in the navigation microcomputer 30 based on a determination result received from the navigation microcomputer 30. When the audio microcomputer 20 determines that the setting information files mismatch with (i.e., are mutually different from) each other (YES at S290), control proceeds to S300. At S300, the audio microcomputer 20 retrieves the setting information file B stored in the nonvolatile memory 24 and transmits the retrieved setting information file B to the navigation microcomputer 30 to proceed to S310. In contrast, when the audio microcomputer 20 determines that the setting information files match with (i.e., are equal to) each other (NO at S290), control proceeds to S310.

At S310, the audio microcomputer 20 determines whether the setting information file stored in the audio microcomputer 20 matches with the corresponding setting information file stored in the display microcomputer 40 based on a determination result received from the display microcomputer 40. Then, when the audio microcomputer 20 determines that the setting information files do not match with each other (YES at S310), control proceeds to S320. At S320, the audio microcomputer 20 retrieves the setting information file A stored in the nonvolatile memory 24 and transmits the retrieved setting information file A to the display microcomputer 40. The, the present process is ended. In contrast, when the audio microcomputer 20 determines that the setting information files match with each other (NO at S310), the present process is ended.

In contrast, at S280, when the audio microcomputer 20 has received the setting information files A, B from the communication microcomputer 10 (YES at S280), control proceeds to S330, and updates the setting information files A, B by writing the receive setting information files A, B in the nonvolatile memory 24. Then, at S340, the audio microcomputer 20 transmits the received setting information file B to the navigation microcomputer 30 to continue with S350. At S350, the audio microcomputer 20 transmits the received setting information file A to the display microcomputer 40, and the present process is ended.

Figure 6:
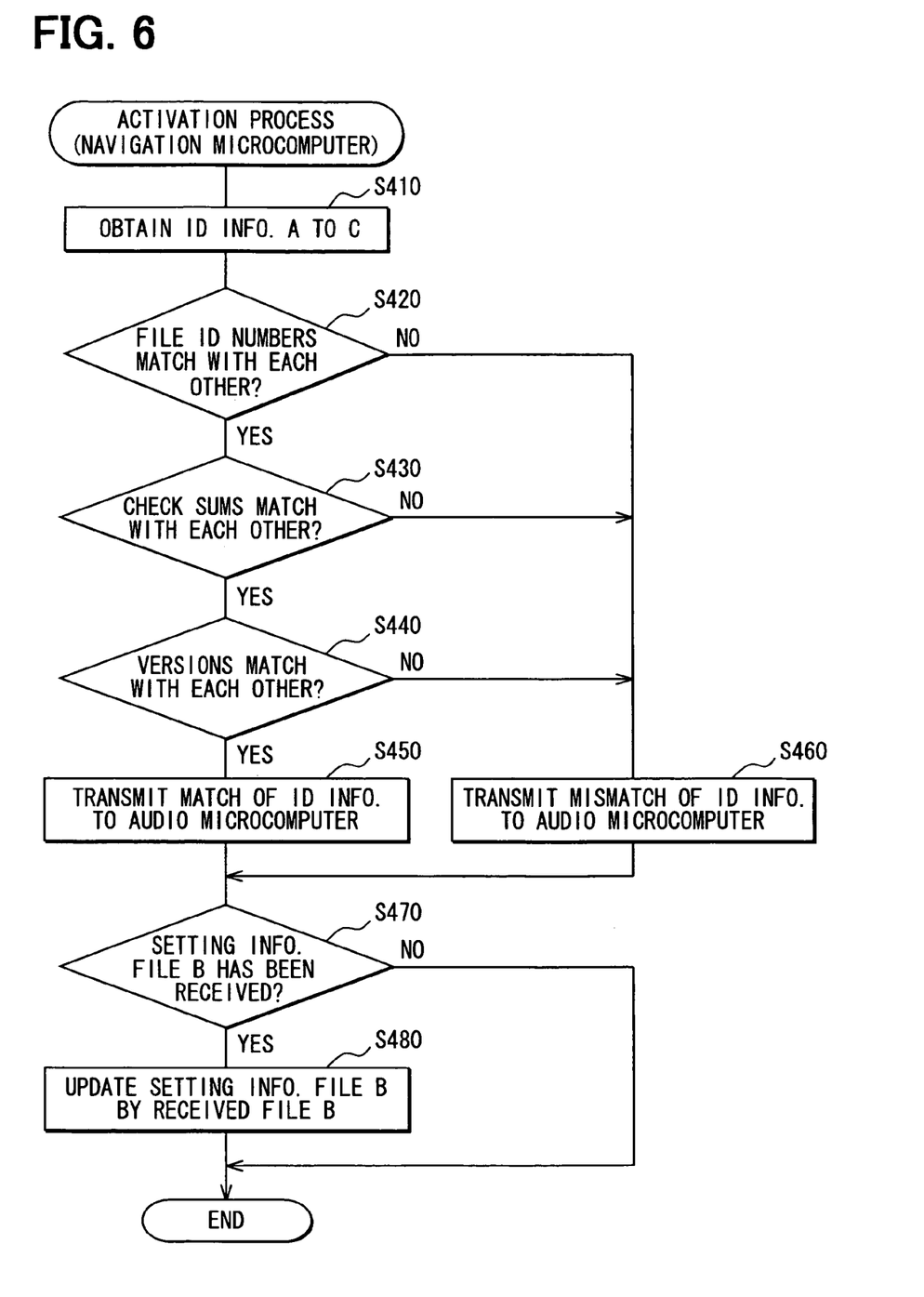
FIG. 6 is a flow chart showing an activation process of a navigation microcomputer.

Next, an activation process of the navigation microcomputer 30 is described. FIG. 6 is a flow chart showing the activation process executed by the navigation microcomputer 30.

The navigation microcomputer 30 is started when the navigation microcomputer 30 retrieves the activation information from the audio microcomputer 20. When the process is started, as shown in FIG. 6, the navigation microcomputer 30 obtains the identification information sets A to C transmitted from the audio microcomputer 20 at S410. At S420, the navigation microcomputer 30 determines whether or not a file identification number of the setting information file B stored in the nonvolatile memory 34 matches with the file identification number included in the obtained identification information B.

Then, when the navigation microcomputer 30 determines at S420 that the file identification numbers match with each other (YES at S420), control proceeds to S430, where the navigation microcomputer 30 determines whether or not a check sum of the setting information file B stored in the nonvolatile memory 34 matches with the check sum of the obtained identification information B.

When the navigation microcomputer 30 determines at S430 that the check sums match with each other (YES at S430), control proceeds to S440, where the navigation microcomputer 30 determines whether or not a version of the setting information file B stored in the nonvolatile memory 34 matches with the version included in the obtained identification information B.

When the navigation microcomputer 30 determines at S440 that the versions match with each other (YES at S440), control proceeds to S450, where the navigation microcomputer 30 transmits a determination result indicative of the match of the identification information to the audio microcomputer 20.

In contrast, when the navigation microcomputer 30 determines at S420 that the file identification numbers do not match with each other (NO at S420), when the navigation microcomputer 30 determines at S430 that the check sums do not match with each other (NO at S430), or when the navigation microcomputer 30 determines at S440 the versions do not match with each other (NO at S440), control proceeds to S460, where the navigation microcomputer 30 transmits a determination result indicative of the mismatch of the identification information to the audio microcomputer 20 to proceed to S470.

Next, at S470, when the navigation microcomputer 30 has received the setting information file B from the audio microcomputer 20 (YES at S470), control proceeds to S480, where the navigation microcomputer 30 updates the setting information file B by writing the received setting information file B in the nonvolatile memory 34. Then, the present process is ended. In contrast, when the navigation microcomputer 30 has not received the setting information file B at S470 (NO at S470), the present process is ended without updating the setting information file B stored in the nonvolatile memory 34.

It is noted that the activation process executed by the display microcomputer 40 is generally identical with the process executed by the navigation microcomputer 30. The activation process executed by the display microcomputer 40 is different from the process executed by the navigation microcomputer 30 only in that a process related to the setting information file A is executed in place of the process related to the setting information file B. Thus, detail description is omitted.

As described above, the navigation system 1 of the present embodiment includes multiple microcomputers 10, 20, 30, 40, which share the setting information file. When the communication microcomputer 10 receives the activation information via the on-vehicle LAN, the communication microcomputer 10 retrieves the identification information from each of the setting information files stored in the nonvolatile memory 14 to send it to the audio microcomputer 20. Then, the audio microcomputer 20 determines whether or not each identification information sent from the communication microcomputer 10 matches with the corresponding identification information of each setting information file stored in the nonvolatile memory 24. When the audio microcomputer 20 determines that the above identification information sets match with each other, the audio microcomputer 20 transmits the determination result indicative of the match of the identification information to the communication microcomputer 10. When the audio microcomputer 20 determines that the above identification information sets mismatch with each other, the audio microcomputer 20 transmits the determination result indicative of the mismatch of the identification information to the communication microcomputer 10.

In contrast, when the communication microcomputer 10 receives the determination result indicative of the mismatch of the identification information from the audio microcomputer 20, the communication microcomputer 10 transmits the setting information files stored in the nonvolatile memory 14 to the audio microcomputer 20.

Also, the audio microcomputer 20 transmits the identification information transmitted from the communication microcomputer 10 to the navigation microcomputer 30 and the display microcomputer 40, and each of the navigation microcomputer 30 and the display microcomputer 40 determines whether or not the identification information transmitted from the audio microcomputer 20 matches with the corresponding identification information of the setting information file stored in the nonvolatile memory 34 and the nonvolatile memory 44, respectively. Here, when the navigation microcomputer 30 (or the display microcomputer 40) determines that the identification information sets match with each other, the navigation microcomputer 30 (or the display microcomputer 40) transmits the determination result indicative of the match of the identification information to the audio microcomputer 20, and when the navigation microcomputer 30 (or the display microcomputer 40) determines that the identification information sets do not match with each other, the navigation microcomputer 30 (or the display microcomputer 40) transmits the determination result indicative of mismatch of the identification information to the audio microcomputer 20.

In contrast, when the audio microcomputer 20 receives the determination result indicative of the mismatch of the identification information from the navigation microcomputer 30 or the display microcomputer 40, the audio microcomputer 20 transmits the setting information file stored in the nonvolatile memory 24 to the corresponding microcomputer, from which the audio microcomputer 20 receives the determination result indicative of the mismatch of the identification information.

Therefore, according to the navigation system 1 of the present embodiment, when the setting information files match with each other among the microcomputers 10, 20, 30, 40, and thereby each setting information file of the audio microcomputer 20, the navigation microcomputer 30, and the display microcomputer 40 is not required to be updated, unnecessary transmission/reception of data (e.g., transmission/reception of the setting information file) among the microcomputers 10, 20, 30, 40 can be reduced. In other words, without performing the unnecessary transmission/reception of data, the setting information file of the audio microcomputer 20, the navigation microcomputer 30, and the display microcomputer 40 can be updated.

Also, because the communication microcomputer 10 retrieves the identification information of the setting information file, and transmits the identification information to the audio microcomputer 20, the audio microcomputer 20 determines whether or not the identification information transmitted from the communication microcomputer 10 matches with the identification information of the setting information file stored in the audio microcomputer 20 without providing an additional microcomputer for determining the identification information.

Further, when the audio microcomputer 20 determines that the identification information sets do not match with each other between the communication microcomputer 10 and the audio microcomputer 20, the audio microcomputer 20 transmits the determination result indicative of the mismatch to the communication microcomputer 10. As a result, the communication microcomputer 10 can still determine the permission and prohibition of the transmission of the setting information file to the audio microcomputer 20 without providing an additional microcomputer that permits or prohibits the transmission of the setting information file from the communication microcomputer 10 to the audio microcomputer 20. Note that transmission/reception of the identification information or of the setting information file between (a) the audio microcomputer 20 and (b) the navigation microcomputer 30 or between (a) the audio microcomputer 20 and (b) the display microcomputer 40 can be performed similar to the transmission/reception between (a) the communication microcomputer 10 and (b) the audio microcomputer 20, and similar advantages can be achieved.

Also, in the navigation system 1 of the present embodiment, because the identification number, the check sum, and the version of the setting information file are employed as the identification information, data amount of the identification information is smaller compared with the setting information file. As a result, compared with a case, where the setting information file is transmitted and received, communication load between the microcomputers can be reduced. Also, the setting information file can be reliably identified with smaller data amount.

Further, the microcomputes 10, 20, 30, 40 are configured to determine that the setting information files match with each other when the identification number, the check sum, and the version of each of the setting information files are mutually identical (match with each other) as described above. Thus, the determination of whether or not the setting information files match with each other can be more reliably made.

In contrast, in the navigation system 1 of the present embodiment, the ROM 12, 22, 32, 42 of each of the microcomputers 10, 20, 30, 40 prestores a corresponding program that is a base for enabling each microcomputer 10, 20, 30, 40 to perform its corresponding function (for example, audio management, navigation). In contrast, each nonvolatile memory 14, 24, 34, 44 stores the setting information file correspondingly to a type (e.g., the vehicle model, area) as a parameter used when each of the above program stored in the ROM 12, 22, 32, 42 is executed. Thus, the change of the setting information file enables the identical microcomputer, which has the same program, to execute different processes correspondingly to the type (e.g., the vehicle model, the area for vehicle use), and thereby the navigation system 1 can be modified as required correspondingly to the above type.

Also, when the ACC switch is turned on and the navigation system 1 receives the activation information via the on-vehicle LAN, the navigation system 1 is activated. Then, it is determined whether the setting information files between the microcomputers match with each other. Thus, in the present configuration of the present embodiment, when the setting information files match with each other among the microcomputers 10, 20, 30, 40, timing for causing each microcomputer 10, 20, 30, 40 to start the process for performing each function becomes earlier compared with the case, where the setting information files do not match with each other. As a result, time that is needed before the entire the navigation system 1 starts functioning can be reduced.

Note that, in the present embodiment, the communication microcomputer 10 corresponds to a first control device of the present invention, and the audio microcomputer 20 corresponds to a second control device of the present invention. Also, the navigation microcomputer 30 and the display microcomputer 40 correspond to a third control device of the present invention, the data (e.g., program) stored in the ROM 12, 22, 32, 42 of each of the microcomputers 10, 20, 30, 40 and in the nonvolatile memory 14, 24, 34, 44 corresponds to control data of the present invention. The setting data corresponds to common data of the present invention.

Also, the process in S100, S260 corresponds to identification information transmitting unit of the present invention, and the process in S220 to S240 and the process in S420 to S440 corresponds to common data match determining unit of the present invention, and the process in S270, S460 corresponds to common data requesting unit of the present invention. Also, the process in S130, S290, S310 corresponds to common data transmission permitting unit of the present invention.

Although the one embodiment of the present invention is described above, the present invention can be applied to various embodiments.

Figure 7:
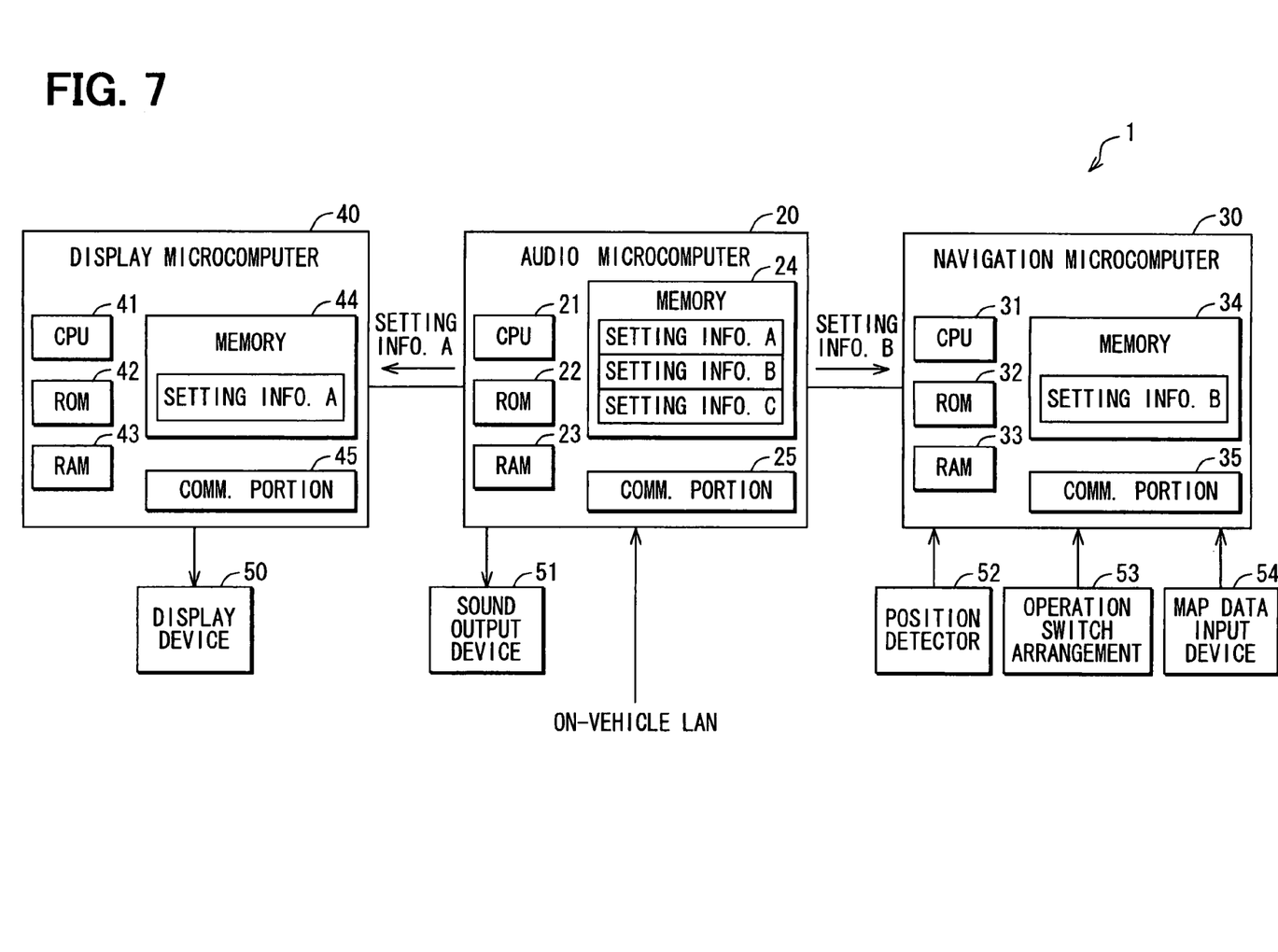
FIG. 7 is a block diagram showing a schematic configuration of a navigation system according to a first modification of the present invention.

In the above embodiment, the communication microcomputer 10 is provided for communicating with the external device outside the system via the on-vehicle LAN. However, without providing the microcomputer 10 for communication, the audio microcomputer 20, which manages the play of CD/DVD and the reception of TV broadcastings and FM/AM radio broadcastings, may be provided with the function of the communication microcomputer 10. In other words, as a navigation system 1 according to a first modification as shown in FIG. 7, the audio microcomputer 20 may be configured to communicate with an external device outside the system, and the nonvolatile memory 24 may store the setting information file used by all of the microcomputers within the system. Then, in the present modification, when the activation information is inputted to the audio microcomputer 20 via the on-vehicle LAN, the audio microcomputer 20 determines whether or not the setting information file stored in the audio microcomputer 20 matches with the corresponding setting information files stored in the navigation microcomputer 30 and the display microcomputer 40 based on the identification information of each of the setting information files A to C stored in the audio microcomputer 20. As necessary, the setting information file of other microcomputer may be updated based on the corresponding setting information files stored in the audio microcomputer 20.

Also in the navigation system 1 of the first modification as above, similar to the navigation system 1 of the above embodiment, when the setting information files among the microcomputers match with each other, a setting information file is not transmitted from the audio microcomputer 20 to the microcomputer that does not need the update. Therefore, this reduces unnecessary transmission of the data, such as transmission/reception of the setting information files when the corresponding setting information files of the navigation microcomputer 30 and the display microcomputer 40 are not needed to be updated.

Note that in the present first modification, the audio microcomputer 20 corresponds to the first control device of the present invention, and the navigation microcomputer 30 and the display microcomputer 40 correspond to the second control device of the present invention.

Figure 8:
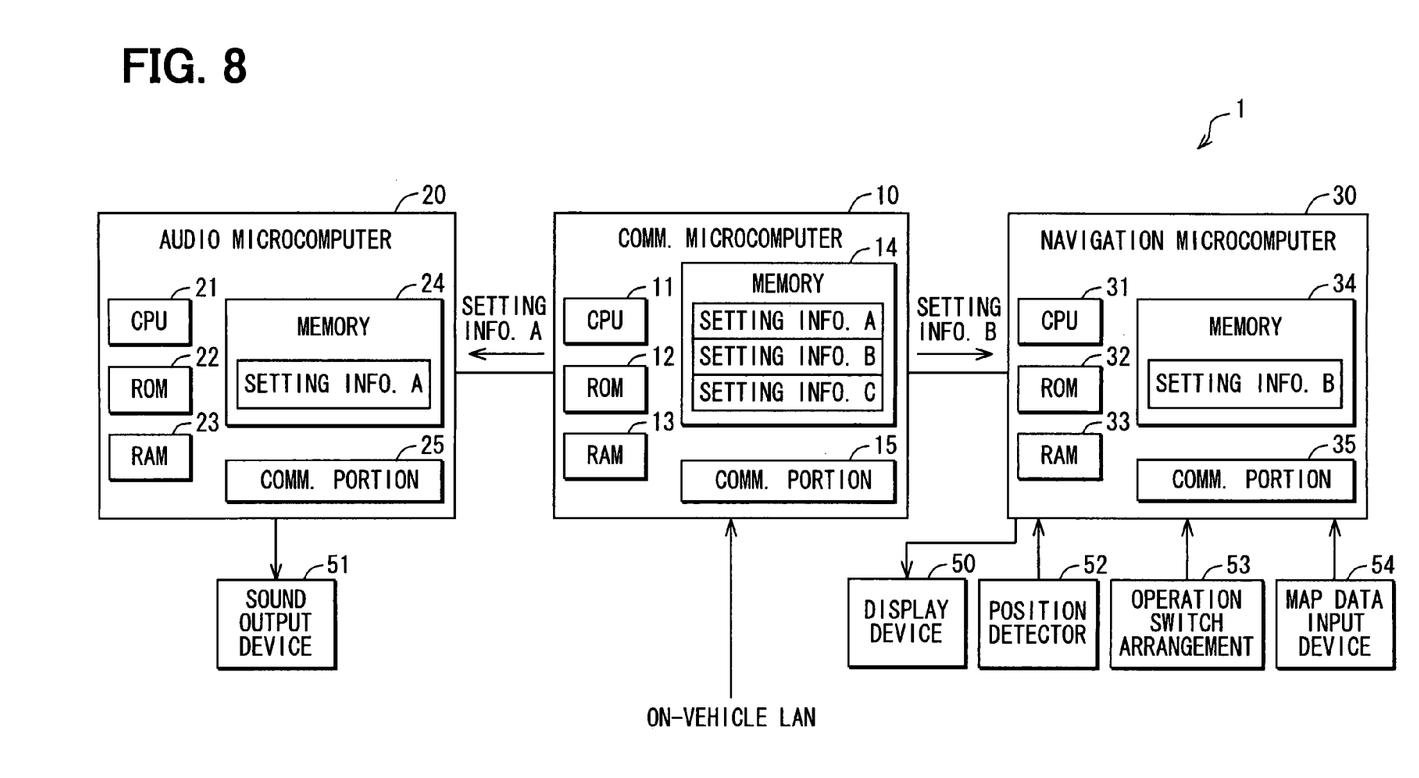
FIG. 8 is a block diagram showing a schematic configuration of a navigation system according to a second modification of the present invention.

In contrast, the navigation system 1 of the one embodiment may be modified such that the communication microcomputer 10 is communicated with each of the audio microcomputer 20 and the navigation microcomputer 30, as shown in the navigation system 1 of a second modification shown in FIG. 8. In the present modification, the identification information is directly transmitted from the communication microcomputer 10 to each microcomputer 20, 30 such that the setting information file stored in each microcomputer 20, 30 can be updated by determining whether the setting information file stored in each microcomputer 20, 30 matches with the setting information file stored in the communication microcomputer 10, and by directly transmitting the setting information file stored in the communication microcomputer 10 from the communication microcomputer 10 to each microcomputer 20, 30 as necessary.

Then, in the navigation system 1 of the above configured second modification, similar to the navigation system 1 of the above embodiment, when the setting information file of each of the microcomputers matches with each other, the setting information file is not transmitted from the communication microcomputer 10 to the microcomputer that does not require the update. As a result, this reduces unnecessary transmission/reception of data, such as the transmission/reception of the setting information file when the setting information file of each of the audio microcomputer 20 and the navigation microcomputer 30 is not to be updated.

Note that in the present second modification, the communication microcomputer 10 corresponds to the first control device of the present invention, and the audio microcomputer 20 and the navigation microcomputer 30 correspond to the second control device of the present invention.

Note that, in the navigation system 1 of the second modification shown in FIG. 8, the navigation microcomputer 30 has the function of the display microcomputer 40, and the navigation microcomputer 30 displays images in the display device 50. However, as in the one embodiment, the display microcomputer 40 may be configured to be communicated with the audio microcomputer 20, and the display microcomputer 40 may be configured to be communicated with the navigation microcomputer 30. Also, the display microcomputer 40 may be configured to be communicated directly with the communication microcomputer 10.

Also, in the one embodiment, the communication microcomputer 10 transmits the identification information upon the activation, and the audio microcomputer 20 is caused to determine whether the identification information sets match with each other. In the above configuration, common data match determining unit of the present invention is achieved. However, the audio microcomputer 20 may alternatively transmits the identification information to the communication microcomputer 10 upon the activation, and the communication microcomputer 10 may be caused to determine whether the identification information sets match with each other. As another alternative configuration, a monitoring microcomputer configured to be communicated with each microcomputer 10, 20, 30, 40 may be additionally provided to the one embodiment, and the monitoring microcomputer may alternatively determine whether the identification information of the setting information file stored in each microcomputer matches with each other upon the activation. When the identification information sets mismatch with each other, the communication microcomputer 10 is caused to transmit the setting information file to the audio microcomputer 20 in the above alternative configuration. Also, the update of each setting information file is not necessarily performed upon the activation. For example, when an update command is inputted via the on-vehicle LAN, the update may be alternatively performed.

Further, in the above embodiment, the identification number, the check sum of the setting data, and the version of the setting data of each setting information file are used as the identification information. However, the identification information is not limited to the above. For example, a creation date or a creator of the setting information file, or information indicative of a creation location, where the setting information file is created, may be employed as the identification information. The creation location may be a country, an area, or a manufacture, and specifically, a China manufacture, or a Europe manufacture may be employed as the creation location, for example. Also, in the above embodiment, when all of the identification number, the check sum of setting data, and the version of the setting data of each setting information file matches, it is determined that the setting information files match with each other. However, for example, when equal to or larger than a predetermined number of identification information among the above identification information sets match with each other, it may be alternatively determined that the setting information files matches with each other. In other words, the setting information file of one microcomputer matches with the setting information file of another microcomputer when at least one of the identification number, the check sum, and the version of the setting information file stored in the one microcomputer matches with a corresponding one of the at least one of the identification number, the check sum, and the version of the setting information file stored in the another microcomputer.

In contrast, in the above embodiment, as the on-vehicle system of the present invention, the navigation system 1 having the audio microcomputer 20, the navigation microcomputer 30, and the display microcomputer 40 is described. However, for example, the present invention may be applied to an integration control system having multiple control devices (e.g., microcomputers, or electronic control units) for controlling each of an engine, a brake, a transmission, a suspension. Also, the present invention may be applied to various on-vehicle systems having multiple control devices.

For example, in one case, the on-vehicle system is a navigation system that includes multiple control devices (e.g., a navigation control device, an audio control device) and a part of the control data is shared as the common data among the multiple control devices, and also, the audio control device shares the common data among the multiple control devices by transmitting the common data to other control devices. In the above case, when the common data stored in the audio control device matches with the common data stored in another control device, the audio control device is not permitted to transmit the common data to the another control device. As a result, the common data is not transmitted, and thereby, unnecessary transmission/reception of the data among the control devices can be reduced.

Additional advantages and modifications will readily occur to those skilled in the art. The invention in its broader terms is therefore not limited to the specific details, representative apparatus, and illustrative examples shown and described.

What is claimed is:

1. An on-vehicle system comprising:

a plurality of control devices, each of which stores control data that includes common data and identification information associated with the common data, the plurality of control devices including a first control device and a second control device, the first control device being configured to transmit the common data stored in the first control device to the second control device such that the common data stored in the second control device is updated;

a common data match determining unit that determines whether or not the common data stored in the second control device matches with the common data stored in the first control device based on the identification information of the common data stored in each of the first and second control devices when a first update condition for updating the common data stored in the second control device is satisfied; and a common data transmission permitting unit that permits the first control device to transmit the common data stored in the first control device to the second control device when the common data match determining unit determines that the common data stored in the second control device mismatches with the common data stored in the first control device, wherein
the plurality of control devices respectively have functions different from each other.

2. The on-vehicle system according to claim 1, wherein:
the plurality of control devices further includes a third control device;
the second control device is configured to transmit the common data stored in the second control device to the third control device such that the common data stored in the third control device is updated;
the common data match determining unit determines whether or not the common data stored in the third control device matches with the common data stored in the second control device based on the identification information of the common data stored in each of the second and third control devices when a second update condition for updating common data stored in the third control device is satisfied; and
the common data transmission permitting unit permits the second control device to transmit the common data stored in the second control device to the third control device when the common data match determining unit determines that the common data stored in the third control device mismatches with the common data stored in the second control device.

3. The on-vehicle system according to claim 1, wherein the second control device is one of a plurality of second control devices.

4. The on-vehicle system according to claim 1, wherein:
the first control device includes an identification information transmitting unit, which retrieves the identification information of the common data stored in the first control device, and which transmits the retrieved identification information to the second control device; and
the common data match determining unit is provided to the second control device and determines whether the identification information transmitted by the identification information transmitting unit of the first control device matches with the identification information of the common data stored in the second control device.

5. The on-vehicle system according to claim 1, wherein:
the second control device includes a common data requesting unit that transmits a request of the common data to the first control device; and
the common data transmission permitting unit is provided to the first control device and permits the first control device to transmit the common data stored in the first control device to the second control device when the common data transmission permitting unit receives the request of the common data transmitted by the common data requesting unit of the second control device.

6. The on-vehicle system according to claim 1, wherein:
the control data stored in the each of the plurality of control devices includes a program for causing the each of the plurality of control devices to achieve a certain respective function; and
the common data stored in the each of the plurality of control devices serves as parameter information used for executing the program of the each of the plurality of control devices.

7. The on-vehicle system according to claim 1, wherein:
the identification information of the common data stored in the each of the plurality of control devices includes at least one of an identification number of the common data, a check sum of the common data, and a version of the common data; and
the common data match determining unit determines that the common data stored in the second control device matches with the common data stored in the first control device when each of the at least one of the identification number, the check sum, and the version of the common data stored in the second control device matches with a corresponding one of the at least one of the identification number, the check sum, and the version of the common data stored in the first control device.

8. The on-vehicle system according to claim 1, wherein:
the identification information of the common data stored in the each of the plurality of control devices includes an identification number of the common data, a check sum of the common data, and a version of the common data; and
the common data match determining unit determines that the common data stored in the second control device matches with the common data stored in the first control device when each of the identification number, the check sum, and the version of the common data stored in the second control device matches with a corresponding one of the identification number, the check sum, and the version of the common data stored in the first control device.

9. The on-vehicle system according to claim 1, wherein when the on-vehicle system is activated, the first update condition is satisfied.

10. The on-vehicle system according to claim 1, wherein:
the first control device is connected with an on-vehicle LAN; and
when the first control device receives an update command of the common data via the on-vehicle LAN, the first update condition is satisfied.

11. The on-vehicle system according to claim 10, wherein the update command is an activation command for activating the on-vehicle system.

12. The on-vehicle system according to claim 1, wherein the plurality of control devices includes a navigation control device.

13. The on-vehicle system according to claim 2, wherein:
the second control device includes an identification information transmitting unit, which retrieves the identification information of the common data stored in the second control device, and which transmits the retrieved identification information to the third control device; and
the common data match determining unit is provided to the third control device and determines whether the identification information transmitted by the identification information transmitting unit of the second control device matches with the identification information of the common data stored in the third control device.

14. The on-vehicle system according to claim 2, wherein:
the third control device includes a common data requesting unit that transmits a request of the common data to the second control device; and
the common data transmission permitting unit is provided to the second control device and permits the second control device to transmit the common data stored in the second control device to the third control device when the common data transmission permitting unit receives the request of the common data transmitted by the common data requesting unit of the third control device.

15. The on-vehicle system according to claim 1, wherein:

the first control device includes a communication circuit for communicating with an exterior device other than the plurality of control devices, and the first control device updates the common data stored in the first control device based on the common data transmitted via the communication circuit.

16. The on-vehicle system according to claim 15, wherein:

the first control device includes all the common data stored in all the plurality of control devices.

17. An on-vehicle system comprising:

a plurality of control devices, each of which stores control data that includes common data and identification information associated with the common data, the plurality of control devices including a first control device and a second control device, the first control device being configured to transmit the common data stored in the first control device to the second control device such that the common data stored in the second control device is updated;

a common data match determining unit that determines whether or not the common data stored in the second control device matches with the common data stored in the first control device based on the identification information of the common data stored in each of the first and second control devices when a first update condition for updating the common data stored in the second control device is satisfied; and a common data transmission permitting unit that permits the first control device to transmit the common data stored in the first control device to the second control device when the common data match determining unit determines that the common data stored in the second control device mismatches with the common data stored in the first control device.

* * * * *